United States Patent [19]

Meyer, Jr. et al.

[11] Patent Number: 4,540,749

[45] Date of Patent: Sep. 10, 1985

[54] ADHESIVE BLENDS

[75] Inventors: Max F. Meyer, Jr.; Gary L. Bond; Richard L. McConnell, all of Kingsport, Tenn.

[73] Assignee: Eastman Kodak Company, Rochester, N.Y.

[21] Appl. No.: 639,159

[22] Filed: Aug. 9, 1984

[51] Int. Cl.³ .............................................. C08G 63/76
[52] U.S. Cl. .................................... 525/437; 156/332; 528/301
[58] Field of Search ................... 528/301; 525/50, 437

[56] References Cited

U.S. PATENT DOCUMENTS

| | | | |
|---|---|---|---|
| 4,130,603 | 12/1978 | Tanaka et al. | 528/301 X |
| 4,156,774 | 5/1979 | Buxbaum et al. | 528/301 X |
| 4,335,188 | 6/1982 | Igi et al. | 528/301 X |
| 4,452,853 | 6/1984 | Schade et al. | 528/301 |

Primary Examiner—Lucille M. Phynes
Attorney, Agent, or Firm—John F. Stevens; William P. Heath, Jr.

[57] ABSTRACT

Disclosed are low-melting blends of polyesters and polyethylene glycols which are useful as adhesives.

11 Claims, No Drawings

ADHESIVE BLENDS

DESCRIPTION

1. Technical Field

This invention relates to low-melting blends of polyesters and polyethylene glycols. These blends are useful as adhesives and provide strong fabric bonds at significantly lower bonding temperatures.

2. Background of the Invention

Certain low-melting polyesters are useful as fabric adhesives in powder and film form. One method of using the powder involves the making of fusible interlinings which are subsequently bonded to a face fabric. For example, fusible interlinings are used in the manufacture of suits, in shirt collars and cuffs, and in the waistband of trousers. Powders are also useful as binders in nonwoven fabrics. Powders used in these applications are generally coarse (40–70 mesh), medium (70–200 mesh), or fine powders (<200 mesh). Films in the range of 1–8 mils thickness are used for applying labels and emblems.

In many commercial operations, the steam presses used to bond fusible interlinings to face fabric are very limited in the maximum temperatures that can be obtained. In many cases, these steam presses cannot reach bonding temperatures above about 104° C. (220° F.). In bonding operations where a delicate, heat-sensitive fabric is being used, it is imperative that the lowest possible bonding temperatures be used to avoid damaging the fabric. In addition, reducing the bonding temperature also decreases the time required to reach the required temperature and thereby increases line speed and production rate and reduces the exposure time of the fabric to intense heat.

Various polymeric powders and films are used in these processes including polyesters, polyethylenes, polyamides, poly(vinyl chloride), and the like. Polyesters are a major type of adhesive used in these applications.

An additive that could substantially decrease the minimum bonding temperature and decrease the melt viscosity of the adhesive without adversely affecting bond strength would obviously provide an economic advantage in reduced energy costs, faster line speeds, and increased production rates with the same equipment.

DISCLOSURE OF THE INVENTION

According to the present invention, adhesive compositions are provided which comprise a hot-melt polyester and about 1–25%, based on the total weight of the composition, of polyethylene glycol having a molecular weight of about 200–14,000.

The polyesters useful in the practice of this invention are those crystalline or semi-crystalline polyesters having melting points of about 80° C. to about 180° C. with heats of fusion ($\Delta H_f$) of about 1 to about 10 calories per gram. Preferred polyesters have melting points (Tm) of about 100° C. to about 150° C. The inherent viscosity (I.V.) of these polyesters may range from about 0.4 to about 1.2 but the preferred range is about 0.5 to about 1.0. Preferably, the polyesters have a glass transition temperature of about −20° C. to about 30° C.

Some preferred copolyesters are described in U.S. Pat. No. 4,094,721. These copolyesters contain terephthalic acid moieties. These terephthalic moieties can be supplied by the usual terephthalic moiety sources, e.g., terephthalic acid, and the mono and dialkyl esters of terephthalic acid. Thus, the term "terephthalic moiety" or "terephthalic acid moiety" is to be considered as including those moieties supplied by the mono- or diester. These polyesters contains terephthalic acid in an amount of at least 40 mol %, based upon the acid moieties. It should be understood by those skilled in the art that the polyesters are prepared by reacting 100 mole % of an acid component and 100 mole % of a glycol component, resulting in repeat units in the polymer chain from the acid component and glycol component. In the preferred polyesters where a second acid is used with terephthalic acid, the second acid may include a saturated aliphatic dicarboxylic acid having terminal carboxylic acid groups having from 4 to about 34 carbon atoms between the two carboxyl groups or aromatic dicarboxylic acids such as isophthalic acid. Preferably, the saturated aliphatic dicarboxylic acid contains between 4 and 8 carbon atoms between the carboxyl groups. Examples of aliphatic dicarboxylic acids contemplated include glutaric, adipic, azelaic or sebacic acid or mixtures thereof. Alternatively, 1 to 60 mole % of the terephthalic acid content can be replaced by isophthalic acid.

The diol component of the copolyesters preferably comprises a mixture of 1,4-butanediol and diethylene glycol, a mixture of 1,6-hexanediol and diethylene glycol or a mixture of 1,6-hexanediol and 1,4-butanediol, where the combined quantities of these diols constitute substantially all of the diol component.

In some cases, one or more additional saturated aliphatic diols having 2 to 12 carbon atoms can be incorporated in addition to the 1,4-butanediol, 1,6-hexanediol and diethylene glycol. In such cases, the third diol is present in an amount up to about 20 mol % based upon the total diol component. The third diol can also be a branched diol. The hydroxyl groups are preferably attached to the terminal carbon atoms. Examples of diols particularly contemplated include ethylene glycol, 1,3-propanediol, 1,5-pentanediol, neopentyl glycol and 1,4-cyclohexanedimethanol.

With respect to the aliphatic or the aromatic dicarboxylic acids, polyester forming derivatives can be used in the preparation of the polyester, especially the mono or dialkyl esters of the dicarboxylic acids, especially $C_1$–$C_4$ mono or dialkyl esters, particularly the dimethyl esters.

Other preferred copolyesters include those derived in conventional manner from an acid component including one or more of the following acids-terephthalic, isophthalic, succinic, adipic, 1,4-cyclohexanedicarboxylic and glutaric, and a glycol component including ethylene glycol, and/or 1,4-cyclohexanedimethanol.

Still other preferred copolyesters are prepared by the condensation polymerization of at least 40 mole percent dimethyl 1,4-cyclohexanedicarboxylate (DMCD) and at least 50 mole % 1,4-butanediol. The acid component may contain up to 60 mol percent of one or more dicarboxylic acid moieties selected from moieties of isophthalic, succinic, adipic and glutaric acid. Up to 50 mole percent of the glycol moieties may be ethylene glycol or diethylene glycol moieties or mixtures thereof. Preferably, the mole percentages are about as follows: DMCD, 65 to 68; other dicarboxylic acid as specified above, 35 to 15; 1,4-butanediol, 65 to 85 and ethylene glycol or diethylene glycol, 35 to 15.

Other preferred copolyesters are derived from about 75 mole % DMCD, about 25 mole % glutaric acid, about 75 mole % 1,4-butanediol and about 25 mole % diethylene glycol.

The dicarboxylic acids and glycols specified for the copolyester are commercially available or they may be prepared by well known procedures. The copolyesters are prepared by reacting the acid or acids with the glycol or glycols in a conventional manner well known in the art.

It has now been found that low-melting polyethylene glycols having melting points of about −15° C. to 67° C. significantly decrease the bonding temperature of the polyester adhesives and also reduce the melt viscosity of the adhesive providing for improved flow out and penetration of the adhesive during the bonding process compared to the unmodified polyesters.

These polyethylene glycols may be added to the polyesters by melt blending after which the polymer blend is conveniently ground to the desired particle size or extruded into film or melt blown webs.

Certain preferred low-melting polyethylene glycols useful in the practice of this invention are terminated with a methoxy group on one end of the polymer chain and a hydroxy group on the opposite end of the chain, or a hydroxy group on each end of the chain. The molecular weight of these polymers may range from about 200 to about 14,000. The melting point range of these polymers is about −15° to about 67° C. The concentration of low-melting polymer may range from about 1 wt. % to 25 wt. % but the preferred concentration range is about 3 to about 22%.

These polyethylene glycols have the formula

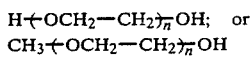

wherein n is an integer which results in a molecular weight of about 200 to about 14,000.

Some suitable low-melting methoxy polyethylene glycols which are commercially available are Carbowax® Methoxy Polyethylene Glycol 350, Carbowax Methoxy Polyethylene Glycol 550, Carbowax Methoxy Polyethylene Glycol 750, Carbowax Methoxy Polyethylene Glycol 2000, and Carbowax Methoxy Polyethylene Glycol 5000 supplied by Union Carbide Corporation.

Some suitable low melting polyethylene glycols include Carbowax Polyethylene Glycol 200, Carbowax Polyethylene Glycol 300, Carbowax Polyethylene Glycol 400, Carbowax Polyethylene Glycol 540, Carbowax Polyethylene Glycol 600, Carbowax Polyethylene Glycol 1000, Carbowax Polyethylene Glycol 1450, Carbowax Polyethylene Glycol 3350, Carbowax Polyethylene Glycol 4600, Carbowax Polyethylene Glycol 8000 and Carbowax Polyethylene Glycol 14,000.

Polyester powder blends containing the low-melting methoxy polyethylene glycols are free-flowing powders which may be readily applied to fabrics by conventional random sprinkling, powder point, or paste application methods. These powder blends may also be applied from electrostatic spray guns. These blends may also be used in thin film form or as a thin hot melt coating from a roll coater. It was also found that the presence of the low-molecular weight polymers reduced the melt viscosity of the resultant blend significantly thus improving the flow out and penetration of the adhesive into the substrate to be bonded.

The resinous compositions also may include additives such as plasticizers. Generally, such compositions include one or more stabilizers to impart resistance to thermal degradation. Inorganic fillers, either fibrous or non-fibrous, as well as pigments may be used where desirable. In addition other resin additives, such as solvents, diluents, binders, tackifying resins and the like may be employed.

The following examples are submitted for a better understanding of the invention.

EXAMPLE 1

A polyester consisting of 70 mole % terephthalic acid, 30 mole % glutaric acid, 55 mole % 1,4-butanediol, and 45 mole % diethylene glycol (55.25 g) having an inherent viscosity of 0.85 (in 60/40 phenol/tetrachloroethane solution at 23° C.), a melting point of 107° C., a glass transition temperature of 2° C., a heat of fusion of 3.5 cal/g and 9.75 g of a methoxy terminated polyethylene glycol having a molecular weight of 5,000 and a melting point of 59° C. and designated commercially as Carbowax Polyethylene Glycol 5000 (Union Carbide Corporation) are blended in a Brabender Plastograph mixer at about 135° C. for 5 minutes in the melt phase under nitrogen. A thin film (3–6 mils) is compression molded of the melt blend at 125° C.

T-peel bonds of 65/35 polyester/cotton twill fabric (4×4 inch test specimens) are prepared with the compression molded film (1×4 inches) in a Sentinel heat sealer at 90°, 100°, and 110° C., 4 sec. bonding time and 16 psig. After bonding, the bonds are quenched on the bench top and ½ inch is trimmed from each side of the bond and three one-inch wide T-peel bonds are cut. The bonds are tested on an Instron machine at 23° C. using a crosshead speed of 2 inches/minute. Bonds are also made from the unmodified polyester in a similar manner for comparison. The results of the bond tests are given below in pounds per linear inch (Pli):

| Bonding Temp | Polyester Control, Pli | Polyester/Polyethylene Glycol Blend, Pli |
| --- | --- | --- |
| 110° C. | 7.0 | 12.0 |
| 100° C. | 0.3 | 6.0 |
| 90° C. | 0.05 | 0.5 |

Similarly good results are obtained using Carbowax Polyethylene Glycol 14,000 (Tm 67° C.) and Carbowax Polyethylene Glycol 4600 (Tm 60° C.).

EXAMPLE 2

The procedure of Example 1 is followed except that 58.50 g of the polyester and 6.50 g of the polyethylene glycol are used. The results of the bond tests are given below.

| Bonding Temp | Polyester Control, Pli | Polyester/Polyethylene Glycol Blend, Pli |
| --- | --- | --- |
| 100° C. | 7.0 | 11.0 |
| 100° C. | 0.3 | 4.9 |
| 90° C. | 0.05 | 0.5 |

Similarly good results are obtained when a copolyester consisting of 80 mole % terephthalic acid, 20 mole % isophthalic acid, 80 mole % 1,6-hexanediol and 20 mole % 1,4-butanediol (I.V. 0.73, Tm 104° C., Tg 15° C., ΔHf 6 cal/g.) is used in the blend.

EXAMPLE 3

The procedure of Example 1 is followed except that 61.75 g of the polyester and 3.25 g of the polyethylene glycol are used. The results of the bond tests are given below.

| Bonding Temp | Polyester Control, Pli | Polyester/Polyethylene Glycol Blend, Pli |
| --- | --- | --- |
| 110° C. | 7.0 | 10.5 |
| 100° C. | 0.3 | 4.5 |
| 90° C. | 0.05 | 0.3 |

EXAMPLE 4

The procedure of Example 1 is followed except that 9.75 g of a methoxy terminated polyethylene glycol having a molecular weight of 2,000 and a melting point of about 52° C. and designated commercially as Carbowax Polyethylene Glycol 2000 is used. The results of the bond tests are given below.

| Bonding Temp | Polyester Control, Pli | Polyester/Polyethylene Glycol Blend, Pli |
| --- | --- | --- |
| 110° C. | 7.0 | 17.6 |
| 100° C. | 0.3 | 11.1 |
| 90° C. | 0.05 | 0.25 |

EXAMPLE 5

The procedure of Example 1 is followed except that 9.75 g of a methoxy terminated polyethylene glycol having a molecular weight of 750 and a melting point of about 30° C. and designated commercially as Carbowax Polyethylene Glycol 750 is used. The results of the bond tests are given below.

| Bonding Temp | Polyester Control, Pli | Polyester/Polyethylene Glycol Blend, Pli |
| --- | --- | --- |
| 110° C. | 7.0 | 14.1 |
| 100° C. | 0.3 | 9.2 |
| 90° C. | 0.05 | 0.20 |

EXAMPLE 6

The procedure of Example 1 is followed except that 9.75 g of a methoxy terminated polyethylene glycol having a molecular weight of 350 and a freezing range of −5° to 10° C. and designated commercially as Carbowax Polyethylene Glycol 350 is used. The results of the bond tests are given below.

| Bonding Temp | Polyester Control, Pli | Polyester/Polyethylene Glycol Blend, Pli |
| --- | --- | --- |
| 110° C. | 7.0 | 13.1 |
| 100° C. | 0.3 | 8.5 |
| 90° C. | 0.05 | 0.50 |

Similarly good results are obtained using Carbowax Polyethylene Glycol 300 (Tm −15° C.).

EXAMPLE 7

The polymer blend from Example 1 is cryogenically ground and sieved to a particle size of 70–200 mesh (medium powder).

Powderpoint fusible interlinings are prepared with this medium powder blend on a small-scale laboratory powderpoint machine. The powder is applied (21.7 g/m$^2$) from an engraved roll to a cotton interlining fabric to form an interlining containing rows of adhesive dots across the interlining fabric (35 dots/cm$^2$). The interlining is used to bond a polyester/cotton face fabric. The interlinings are bonded to the face fabrics by pressing four-inch squares of interlining to four-inch squares of polyester twill face fabric using an electrically heated garment press at 100° C. The bonded fabrics are cut into strips one inch (2.54 cm) wide and T-peel strengths are determined. The T-peel strengths reported are an average of three determinations per sample. The peel strength is 340 g/linear cm at 23° C. (30.5 cm/minute testing rate).

Similar tests with the unmodified polyester described in Example 1 give a T-peel bond strength of only 18 g/linear cm.

Similarly good results are obtained when a copolyester consisting of 100 mole % terephthalic acid, 80 mole % 1,6-hexanediol and 20 mole % 1,4-butanediol (I.V. 0.70, Tm 128° C., Tg 18° C., ΔHf 9 cal/g) is used in the blend and the bonds are made at 130° C.

EXAMPLE 8

A polyester nonwoven web is formed by passing polyester staple fiber through a Textile Card machine to give a web weight of 13.7 g/m$^2$. Medium powder (70–200 mesh) of the polymer blend described in Example 1 is fluidized with nitrogen and sprayed on the web with an electrostatic gun to give a uniform coating. The web is passed through a heating chamber of infrared heaters to fuse the adhesive powder and then through calendering rolls. The weight of adhesive in the web is 3.42 g/m$^2$. The web has a nice soft hand and is strong and uniformly bonded in both the machine and transverse directions.

EXAMPLE 9

An aqueous dispersion is prepared consisting of 40 g of fine powder (<200 mesh) of a polyester consisting of 70 mole % terephthalic acid, 30 mole % glutaric acid, 55 mole % 1,4-butanediol, and 45 mole % diethylene glycol having an inherent viscosity of 0.83 (in 60/40 phenol/tetrachloroethane solution at 23° C.), a melting point of 107° C., and a glass transition temperature of 2° C., 5 g of a polyethylene glycol having a molecular weight of 400 and commercially designated as Carbowax Polyethylene Glycol 400, 2 g of Acrysol ASE-95 surfactant, 0.05 g of Merpol LF-H surfactant, 0.2 g of ammonium hydroxide, and water sufficient to give a total weight of 100 g.

The adhesive formulation is applied to 100% cotton fabric of silk screening to provide a coating weight of 101.6 g/m$^2$ (3 oz/yd$^2$) after drying in an oven at 149° C. (300° F.).

The coated fabric is steam bonded in a Hoffman press to similar uncoated cotton fabric for 5 seconds under steam to give a temperature of 105° C. followed by 5 sec. cooling. The T-peel strength of the bond is determined on a Scott tester to be 590 g/cm per 28.3 g of adhesive applied (3.3 pli per ounce of adhesive applied).

Similar bond tests with a comparable adhesive dispersion which does not contain the Carbowax 400 component give a bond strength of only 143 g/cm per 28.3 g of adhesive applied (0.8 pli per ounce of adhesive).

Bond strengths comparable to that obtained with the dispersion containing the Carbowax 400 polyethylene glycol are also obtained when that formulation contains 5 g of 30% aqueous dispersion of a polyester consisting of 90 mole % isophthalic acid, 10 mole % 5-sodiosulfoisophthalic acid, and 100 mole % of diethylene glycol having an inherent viscosity of 0.40 (in 60/40 phenol/tetrachloroethane solution at 23° C.).

In all the above examples according to this invention, the $\Delta H_f$ of the polyester is between 1 and 10 cal/gm.

Whenever the term "inherent viscosity" (I.V.) is used in this application, it will be understood to refer to viscosity determinations made at 25° C. using 0.5 gram of polymer per 100 ml. of a solvent composed of 60 wt. % phenol and 40 wt. % tetrachloroethane.

The $T_m$ and $T_g$ of the polymers described herein are readily obtained with a Differential Scanning Calorimeter.

The "heat of fusion" $\Delta H_f$ of polymers is the amount of heat absorbed when crystallizable polymers are melted. $\Delta H_f$ values are readily obtained using Differential Scanning Calorimeters (Perkin-Elmer). For example, one method for determining $\Delta H_f$ is described in Journal of Applied Polymer Science 20, 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

The strength of the bonds is determined by the so-called "Peel Test" based on a modification (i.e., three test specimens) of the ASTM "T-Peel Test" set forth on pages 63 and 64 of the 1964 edition of the BOOK OF ASTM STANDARDS, published by the American Society for Testing Materials, and more specifically identified as Test Number D-187-61-T.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A composition comprising a blend of
(a) about 75–99% based on the total weight of the composition of a polyester having a melting point of about 80° C.–180° C., a heat of fusion of about 1–10 calories per gram and an I.V. of about 0.4–1.2, and
(b) about 1–25% based on the total weight of the composition of a polyethylene glycol having a melting point of about −15° to about 67° C. of the formula $$H \!\!+\!\! OCH_2-CH_2 \!\!\rightarrow_{\overline{n}}\!\! OH \quad \text{or}$$
$$CH_3 \!\!+\!\! OCH_2-CH_2 \!\!\rightarrow_{\overline{n}}\!\! OH$$

wherein n is an integer which provides a molecular weight of about 200–14,000.

2. Composition according to claim 1 wherein said polyester is derived from at least 40 mole % terephthalic acid, based on a total acid content of 100 mole % in the polyester.

3. Composition according to claim 1 wherein the glycol component of said polyester comprises 1,4-butanediol or diethylene glycol.

4. Composition according to claim 1 wherein the glycol component of said polyester comprises 1,4-butanediol and diethylene glycol.

5. Composition according to claim 1 wherein said polyester is derived from at least 40 mole % terephthalic acid, based on a total acid content of 100 mole % in the polyester, and the glycol component of said polyester comprises 1,4-butanediol and diethylene glycol.

6. Composition according to claim 1 comprising about 78–97% polyester and about 22–3% polyethylene glycol, said percentages being based on the total weight of the composition.

7. Composition according to claim 1 wherein said polyethylene glycol has the formula $$H(OCH_2-CH_2)_n OH$$

wherein n is an integer which results in a molecular weight of about 200–14,000.

8. Composition according to claim 1 wherein said polyethylene glycol has the formula $$CH_3(OCH_2-CH_2)_n OH$$

wherein n is an integer which results in a molecular weight of about 200–14,000.

9. Composition according to claim 1 in finely divided particulate form.

10. A substrate having a coating of the composition of claim 1.

11. Method of adhesively connecting a pair of substrates which comprises interposing the composition of claim 1 between the substrates, and applying sufficient heat to fuse the substrates together.

* * * * *